July 24, 1951  D. ZSCHOKKE  2,561,455
DEVICE FOR PHASE MODULATION
Filed March 5, 1948

Inventor
Diethelm Zschokke
By Robert E Burns
Attorney

Patented July 24, 1951

2,561,455

UNITED STATES PATENT OFFICE 2,561,455

DEVICE FOR PHASE MODULATION

Diethelm Zschokke, Solothurn, Switzerland, assignor to Autophon Aktiengesellschaft, Solothurn, Switzerland Application March 5, 1948, Serial No. 13,251
In Switzerland March 10, 1947

4 Claims. (Cl. 332—23)

Circuits are known which enable to modulate the frequency of an alternating voltage by modulating its phase, the instantaneous phase shift being in advance with a positive modulating voltage and in retardation with a negative modulating voltage with respect to the carrier frequency.

For communication purposes, it is desirable to apply phase departures of 800 or more angular degrees, i. e. the instantaneous advance or retardation of phase should total up to several periods. The technical modulation methods known up to now do not enable to produce directly such considerable shifts. The phase departures obtainable in known circuits and with a sufficiently linear modulation are of the order of several degrees. In order to obtain phase departures of several hundred degrees, the carrier frequency is kept small and it is increased after modulation, the phase shift then being increased in the same proportion. In order not to be forced to apply too large an increase, the requirement is being maintained that phase departures as high as possible should be obtained in the modulation. A further simultaneous requirement is that the phase shift should be as far as possible directly or indirectly proportional to the instantaneous value of the modulating voltage, i. e. that the modulation is linear as far as possible.

A peculiarity of most of the known phase modulators is that the modulation is not an absolutely linear function of the modulating voltage, but that it follows the arcus sinus or the arcus tangens law and that it is sufficiently linear and of practical use only in the region of arc sin δ ~ arc tg δ. This comprises only part of the theoretically possible region. In known phase modulators such theoretically phase departure amounts to 90° or, in other circuits, to a maximum of 180°.

The present invention relates to a device for phase modulation, characterised in that the modulated voltage is produced by means of a bridge circuit arranged in such a manner that the maximum possible phase departure of the modulated voltage exceeds 180°. This is obtained in that at least one arm of the bridge comprises a variable reactance which is arranged, for example, in such a manner that its susceptance may be made positive as well as negative, the other part operating as fixed voltage divider whereby the input voltage is decomposed into two equal in-phase components. If the susceptance is made positive and infinite, then the phase shift of the modulated voltage will show a maximum advance of 180°, in the case of the susceptance being equal to zero, there will be no phase shift and if the susceptance is made negative and infinite, the phase shift will show a maximum retardation of 180°. With such circuit arrangements phase departures which exceed, for example 180° and which amount to a maximum of 360°, may be obtained.

Executional forms of the present invention are explained by way of example and illustrated in the accompanying drawing.

Figure 1:
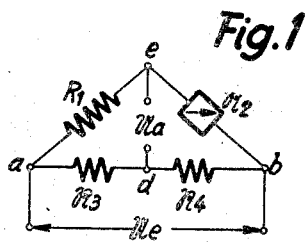
Fig. 1 shows the circuit of a phase bridge with a variable apparent resistance.
Figure 4:
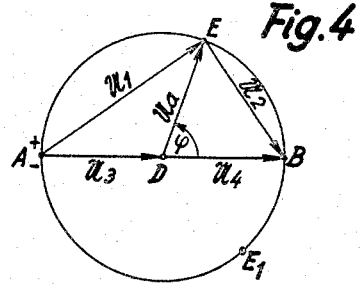
Fig. 4 shows a vector diagram of the phase bridge with a variable loss-free reactance.
Figure 2:
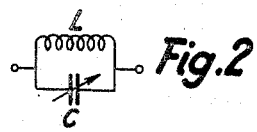
Figs. 2 and 2a show variable loss-free reactances.
Figure 2A:

The phase bridge according to Fig. 1 comprises a voltage divider between the points $a$ and $b$, consisting of the two fixed resistances $R_3$ and $R_4$. The arm $a$—$e$ contains a resistance $R_1$ and the arm $e$—$b$ a variable reactance. It is of no moment for the invention whether the two resistances $R_3$ and $R_4$ are real or complex under the condition that both are of equal magnitude and in phase. The resistance $R_1$ is a pure resistance. For the variable reactance the condition is, that it may assume positive and negative values. Such reactance is assumed to be loss-free. Figs. 2 and 2a show two examples of such reactances, it being of no importance whether inductances L and capacitance C are arranged in parallel or in series; it is, however, practical to have them in parallel if the susceptance is considered and to have them in series if reactance is considered. By way of example, the capacitance C is assumed to be variable, but it is also possible to choose a variable inductance, or to vary both simultaneously in push-pull.

If a sinusoidal alternating voltage $v_e$ is applied to points $a$ and $b$, two voltages $v_3$ and $v_4$ equal in magnitude and phase will be produced in the resistances $R_3$ and $R_4$ which are represented by the lengths A—D and D—B on a straight line. A voltage $v_1$, is generated in the bridge arm $a$—$e$ and a voltage $v_2$ in the bridge arm $e$—$b$, $R_1$ being an effective resistance and $R_2$ a pure reactance, the two voltages $v_1$ and $v_2$ will be phase-shifted through 90°. Thus, the vectors $v_1$ and $v_2$ are at right angles. Between the points $d$ and $e$ of the bridge, a voltage $v_a$ may be tapped, the magnitude of which is equal to that of the voltages $v_3$ and $v_4$ and which is phase-shifted with respect to these voltages through the angle $\delta$. If the reactance $R_2$ is varied, the magnitude and phase of voltage $v_2$ varies with respect to the input voltage $v_e$, the phase-shift through 90° with respect to voltage $v_1$ remains and the magnitude and phase of voltage $v_1$ also varies with respect to the input voltage $v_e$. The magnitude of voltage $v_a$ remains unvaried and shifts in phase with respect to the input voltage $v_e$. The arrow tip of $v_a$ (point E) rotates along a circle with the voltage centre in D. In the position represented, the point E corresponds to a positive reactance $R_2$. If the reactance becomes infinite, the arrow tip $v_a$ travels to A and the phase shift $\delta$ becomes +180°; if the reactance becomes zero (=resonance), the phase shift is also zero and the arrow tip coincides with B. If the reactance is negative, the arrow tip travels from $v_a$ further to point $E_1$ and the phase shift becomes negative, i. e. retarded. If the reactance is again infinite but negative, the arrow point rotates to A and the phase shift becomes —180°. This explanation concerns a loss-free reactance.

Figure 3:
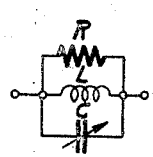
Figs. 3 and 3a show variable loss-containing reactances.
Figure 5:
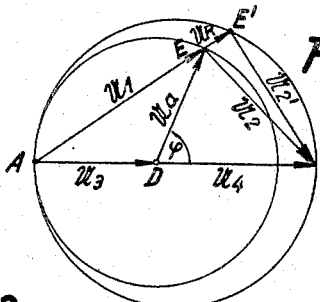
Fig. 5 shows a vector diagram with a variable loss-containing reactance.
Figure 3A:

If the reactance is loss-containing, it may be represented as a complex apparent resistance with a real and unreal part. Figs. 3 and 3a show, by way of example, circuits, the three quantities being again advantageously assumed in parallel if the conductance is considered, or in series if the resistance is considered. Fig. 5 shows the corresponding vector diagram in case of a series circuit. The voltage $v_2$ across the loss-containing reactance consists of a component $v_R$ corresponding to real resistance R and of a component $v_i$ corresponding to the unreal resistance, both components being phase-shifted through 90° and their vectors being at right angles. The component $v_R$ is in phase with the voltage $v_1$, because both voltages are generated across effective resistances connected in series. The vectors $v_1$ and $v_R$ are on a straight line. The imaginary voltage point E' is positioned on a circle with the distance A—B as diameter, the distance A—B again representing the sum of the two in-phase voltages $v_3$ and $v_4$. In the case of a loss-containing reactance $R_2$ it is necessary to choose the resistance $R_4$ in excess of $R_3$ in such a manner that the following proportion is valid for the tensions:

$$\frac{v_4 - v_3}{2v_3} = \frac{v_R}{v_1}$$

Such proportionality enables the arrow tip of the voltage vector $v_3$ to be positioned in the centre of a circle passing through the points A and E. Now a voltage $v_a$ phase-shifted through the angle $\delta$ may again be tapped between the points $d$ and $e$ of the bridge. By varying the reactance $R_2$ from $+\infty$ through zero to $-\infty$, a phase-shift of voltage $v_a$ from +180° through axis AB to —180° is again obtained and the arrow tip of vector $v_a$ travels along a circle through the points A, E and with the centre in D. It will be noticed that the loss-containing part of reactance $R_2$ does not disadvantageously influence the phase modulation, but only means a loss in the absolute value of the tapped voltage.

If a parallel oscillatory circuit is used, the vector diagram of Figure 5 is reflected in point D. However, the voltage $v_R$ corresponds to the voltage appearing over the resistance $R_1$ and the voltage $v_1$ corresponds to the voltage appearing over the loss resistance of the parallel oscillating circuit. By analogy the value of the impedance $R_3$ has to exceed that of $R_4'$ so that the following proportion is valid for the voltages:

$$\frac{v_3 - v_4}{2v_4} = \frac{v_1}{v_4}$$

Owing to the fact that the maximum phase departure, obtainable by means of the circuit arrangement according to the invention, in any case exceeds 180°, it follows that the phase departure which may be practically made use of with a greatest admissible distortion, is a multiple and at least the double of the phase departure of hitherto known circuits.

What I claim is:

1. In an arrangement for phase modulation, in combination, a bridge circuit comprising four bridge branches, at least one of said brilge branches having an oscillating circuit the resonance frequency of which is variable, a pure effective resistance in one of said branches and awo impedances of equal phase shift in adjacent bridge branches to form a voltage divider connected to the input voltage, the impedance adjacent the oscillating circuit being sufficiently larger than the other of said impedances that the usuable voltage for each phase angle has a constant amplitude.

2. In an arrangement for phase modulation, in combination, a bridge circuit comprising four bridge arms, one of said arms having a loss-containing oscillatory circuit the resonant frequency of which is variable, an adjacent arm having a pure resistance and the remaining two arms having each an impedance of equal phase shift to form a voltage divider connected to the input of the bridge, one of said impedances being sufficiently greater than the other of said impedances that the usuable voltage for each phase angle has a constant amplitude.

3. In an arrangement according to the claim 2, the said oscillatory circuit being a series oscillatory circuit, the impedance adjacent the said series-oscillatory circuit being larger than the impedance adjacent the said pure resistance, and the ratio of the difference of said impedances to double the smaller impedance being equal to the ratio of the loss resistance of the said series oscillatory circuit to the said pure resistance.

4. In an arrangement according to claim 2, the said oscillatory circuit being a parallel-oscillating circuit, the impedance adjacent the said parallel-oscillatory circuit being smaller than the impedance adjacent the said pure resistance, and the ratio of the difference of said impedances to double the said smaller impedance being equal to the ratio of the said pure resistance to the loss resistance of said parallel oscillatory circuit.

DIETHELM ZSCHOKKE.

REFERENCES CITED

The following references are of record in the file of this patent:

UNITED STATES PATENTS

| Number | Name | Date |
|---|---|---|
| 1,900,538 | Bedford | Mar. 7, 1933 |
| 1,901,694 | Bedford | Mar. 14, 1933 |
| 1,950,406 | Hoorn | Mar. 13, 1934 |
| 2,042,234 | Lyle | May 26, 1936 |
| 2,045,107 | Shore | June 23, 1936 |
| 2,125,127 | Roberts | July 26, 1938 |
| 2,160,528 | Uusselman | May 30, 1939 |